United States Patent
Saha et al.

(10) Patent No.: US 10,853,051 B2
(45) Date of Patent: Dec. 1, 2020

(54) AUTOMATED CANDIDATE REPAIR PATCH GENERATION

(71) Applicant: FUJITSU LIMITED, Kawasaki (JP)

(72) Inventors: Ripon K. Saha, Santa Clara, CA (US); Wenyu Wang, Sunnyvale, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 22 days.

(21) Appl. No.: 16/268,359

(22) Filed: Feb. 5, 2019

(65) Prior Publication Data
US 2020/0249929 A1    Aug. 6, 2020

(51) Int. Cl.
G06F 8/65    (2018.01)
G06F 11/36    (2006.01)
G06F 16/2458    (2019.01)

(52) U.S. Cl.
CPC ............ *G06F 8/65* (2013.01); *G06F 11/3664* (2013.01); *G06F 16/2465* (2019.01); *G06F 2216/03* (2013.01)

(58) Field of Classification Search
None
See application file for complete search history.

(56) References Cited

U.S. PATENT DOCUMENTS

| | | | |
|---|---|---|---|
| 9,959,111 B2 * | 5/2018 | Plate | G06F 8/71 |
| 2014/0149435 A1 * | 5/2014 | Sisman | G06F 11/362 707/751 |
| 2019/0317760 A1 * | 10/2019 | Kessentini | G06F 8/72 |

OTHER PUBLICATIONS

Le, "History Driven Program Repair", 2016, 2016 IEEE 23rd International Conference on Software Analysis, Evolution, and Reengineering (Year: 2016).*
Mechtaev, "Angelix: Scalable Multiline Program Patch Synthesis via Symbolic Analysis", 2016, Published in: 2016 IEEE/ACM 38th International Conference on Software Engineering (ICSE) (Year: 2016).*
Jiang, "Shaping Program Repair Space with Existing Patches and Similar Code", 2018, ISSTA'18, Jul. 16-21, 2018, Amsterdam, Netherlands (Year: 2018).*
Oracle, "Data Mining Concepts", 2020, Published by Oracle, at https://docs.oracle.com/cd/B28359_01/datamine.111/b28129/ process. htm#DMCON002 (Year: 2020).*
Mechtaev, Publication title: "Angelix: Scalable Multiline Program Patch Synthesis via Symbolic Analysis", 2016, Published in: 2016 IEEE/ACM 38th International Conference on Software Engineering (ICSE) (Year: 2016).*
Le, Publication title: "History Driven Program Repair", 2016 IEEE 23rd International Conference on Software Analysis, Evolution, and Reengineering (Year: 2016).*

(Continued)

*Primary Examiner* — Hossain M Morshed
(74) *Attorney, Agent, or Firm* — Maschoff Brennan

(57) ABSTRACT

A method of automated candidate repair patch generation may include synthesizing repair expressions based on project code. Concise repair expressions may be mined from a code database. A set of repair expressions may be generated based on the synthesized repair expressions and the mined repair expressions. The set of repair expressions may include further repair expressions further synthesized from the synthesized repair expressions and the mined repair expressions. Candidate patches may be generated based on a repair schema and the set of repair expressions.

18 Claims, 3 Drawing Sheets

(56) References Cited

OTHER PUBLICATIONS

Jiang, "Shaping Program Repair Space with Existing Patches and Similar Code", 2018, ACM at ISSTA'18, Jul. 16-21, 2018 (Year: 2018).*
Duong et al., "SemFix: Program repair via semantic analysis", [ICSE May 18, 2013].
Mechtaev et al., "DirectFix: Looking for Simple Program Repairs" IEEE International Conference on Software Engineering [ICSE May 16, 2015].
Mechtaev et al.,"Angelix: Scalable Multiline Program Patch Synthesis via Symbolic Analysis" IEEE International Conference on Software Engineering [ICSE May 14, 2016].
Xuan et al., "Nopol: Automatic Repair of Conditional Statement Bugs in Java Programs", IEEE Transactions on Software Engineering [TSE Apr. 29, 2016].
Kim et al., "Automatic patch generation learned from human-written patches" PAR [ICSE May 18, 2013].
Long et al., "Staged program repair with condition synthesis" SPR [FSE Aug. 30, 2015].
Long et al., "Automatic patch generation by learning correct code" Prophet [POPL Jan. 20, 2016].
Wen et al., "Context-aware patch generation for better automated program repair" CapGen [ICSE May 27, 2018].
Jiang et al., "Shaping program repair space with existing patches and similar code", SimFix [ISSTA Jul. 16, 2018].
Bach D. Le et al., "History Driven Program Repair" HD-Repair, IEEE 23rd International Conference on Software Analysis, Evolution, and Reengineering [SANER Mar. 14, 2016].
Xiong et al., "Precise condition synthesis for program repair" ACS [ICSE May 20, 2017].
Xin et al., "Leveraging syntax-related code for automated program repair" ssFix [ICSE Oct. 30, 2017].

* cited by examiner

AUTOMATED CANDIDATE REPAIR PATCH GENERATION

FIELD

The embodiments discussed in the present disclosure are related to automated candidate repair patch generation.

BACKGROUND

Software programs often have defects or faults in them (commonly referred to as "bugs") in which they may not operate as intended. Often automated repair systems are used in attempt to identify and correct defects in software programs.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of automated candidate repair patch generation may include synthesizing repair expressions based on project code. Concise repair expressions may be mined from a code database. A set of repair expressions may be generated based on the synthesized repair expressions and the mined repair expressions. The set of repair expressions may include further repair expressions further synthesized from the synthesized repair expressions and the mined repair expressions. Candidate patches may be generated based on a repair schema and the set of repair expressions.

The object and advantages of the embodiments will be realized and achieved at least by the elements, features, and combinations particularly pointed out in the claims.

It is to be understood that both the foregoing general description and the following detailed description are exemplary and explanatory and are not restrictive of the claims.

BRIEF DESCRIPTION OF THE DRAWINGS

Example embodiments will be described and explained with additional specificity and detail through the use of the accompanying drawings.

DESCRIPTION OF EMBODIMENTS

Figure 1:
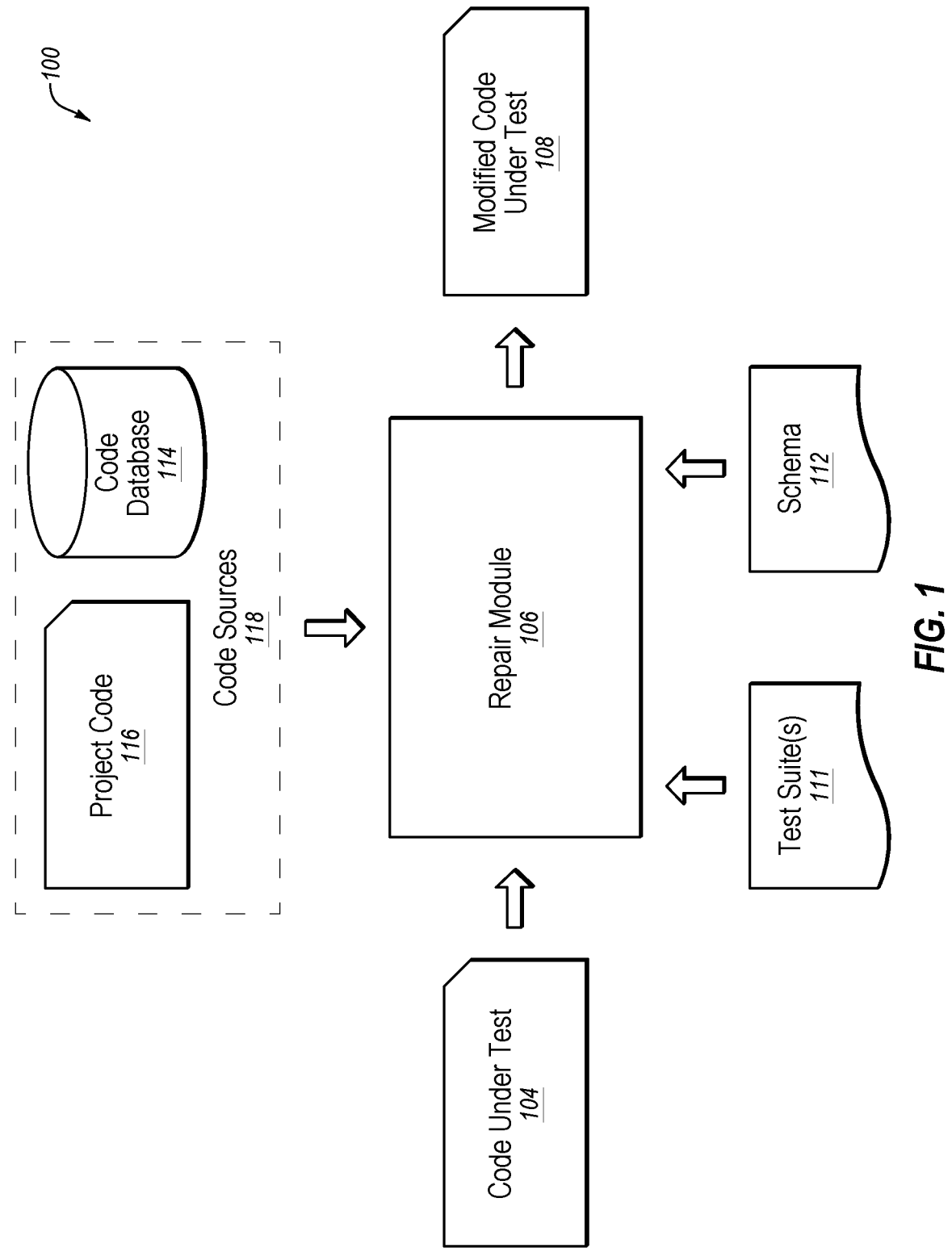
FIG. 1 is a diagram representing an example environment related to repairing a software program.

Some embodiments described in the present disclosure relate to methods and systems of generating software patches for repairing software programs. Software programs often include defects or faults (also commonly referred to as "bugs") that may cause the software programs to behave in an unintended manner. Additionally, automated repair systems and techniques are often used to detect defects and to generate software patches to repair software programs. However, automated repair systems and techniques often do a poor job at generating patches to correct defects of the software programs.

For instance, some automated repair systems may employ constraint-solver-based approaches and may synthesize patches by generating constraints from test cases and solving the constraints. Such an approach may be limited in handling potentially complex program constructs, such as method invocations. Some other automated repair systems may employ generate-and-validate-based approaches and may employ simple variables and objects to synthesize candidate patches. The candidate patches may be validated iteratively based on heuristics or machine learning techniques. Such approaches may be constrained to limited repair expressions to discourage repair space explosion. Still other automated repair systems may leverage similar code from a library of projects to repair bugs. If code that may repair the defect is not present in the project library, a patch may not be generated.

Software repair and debugging (described herein generally as "software repairs") adds significant cost to software development. By some measurements, software repairs may demand approximately 50% of programming time from software developers. Software defects and their repair may be a construct of computer technology. For instance, software and software defects may not exist outside of the realm of computer technology.

In some embodiments, repair tools may be deployed as a stand-alone tool and/or as a plug-in tool for a software development environment. Alternately or additionally, repair tools may be deployed as a service to support software developers. For instance, repair tools may be a part of an internet-based service. The repair tools may support software development, diagnosis, patching, and upgrade services.

Embodiments of this disclosure may combine synthesized program artifacts and mined program artifacts to improve a scope of automatic repair tools. Furthermore, embodiments may synergize the synthesis based features and the mining based features in a manner that encourages repair space completeness within a relevant scope while discouraging repair space explosion, which may occur as a result of combining synthesis based and mining based features in a straightforward manner. For example, embodiments may employ a comprehensive list of mining based features to infer correct repair expressions.

Some embodiments may employ, without limitation, co-occurrence analysis, context analysis, and schema driven analysis. Embodiments of the disclosure may facilitate identification of plausible patches for software defects for which existing repair tools may fail to identify plausible patches.

Embodiments of the present disclosure are explained with reference to the accompanying drawings.

FIG. 1 is a diagram representing an example automated software repair system 100 related to repairing a software program, such as a software program associated with project code 116. The automated software repair system 100 may include a repair module 106 configured to analyze code under test 104 for defects. The repair module 106 may also be configured to output modified code under test 108, which may include one or more modifications made to the code under test 104 by repair operations performed by the repair module 106. For example, the modified code under test 104 may include a plausible patch for repairing the defect of the software program.

The code under test 104 may include electronic data, such as, for example, the software program, code of the software program, libraries, applications, scripts, or other logic or instructions for execution by a processing device. In some embodiments, the code under test 104 may include a complete instance of the software program. Additionally or alternatively, the code under test 104 may include a portion of the software program. The code under test 104 may be written in any suitable type of computer language that may be used for the software program. The code under test 104 may include one or more defects.

The repair module 106 may include code and routines configured to enable a computing device to perform one or more modifications of the code under test 104 to generate the modified code under test 108. Additionally or alternatively, the repair module 106 may be implemented using hardware including a processor, a microprocessor (e.g., to perform or control performance of one or more operations), a field-programmable gate array (FPGA), or an application-specific integrated circuit (ASIC). In some other instances, the repair module 106 may be implemented using a combination of hardware and software. In the present disclosure, operations described as being performed by the repair module 106 may include operations that the repair module 106 may direct a corresponding system to perform.

The repair module 106 may be configured to perform a series of repair operations with respect to the code under test 104 that may be used to repair (also referred to as correct) one or more defects in the code under test 104. In some embodiments, the repair module 106 may be configured to perform one or more of the repair operations based on one or more schemas 112 and one or more test suites 111.

The schemas 112 may include code templates that, when populated with repair expressions as described herein, may form candidate patches for repairing the defects of the code under test 104. As described herein, a candidate patch that satisfies the tests of the one or more test suites may be outputted as the modified code under test 108 or a portion of the modified code under test 108. The modifications may include changes in the code under test 104 that may repair or attempt to repair the defects. In the present disclosure, the modifications that may be performed may be referred to as "candidate patches."

The test suites 111 may include one or more routines that may act as test cases for the code under test 104. The test suites 111 may be configured to determine whether the code under test 104 behaves in a specified manner. The test suites 111 may be configured according to any suitable technique.

The repair module 106 may be configured to apply one or more of the test suites 111 with respect to the code under test 104 to detect or determine one or more faults and corresponding fault locations in the code under test 104. In some embodiments, the repair module 106 may be configured to execute one or more tests included in the test suites 111, which may be referred to as performing a test execution. A test execution that passes may be referred to as a "passing test execution" and a test execution that fails may be referred to as a "failing test execution." In some embodiments, a defect location and corresponding defect of the code under test 104 may be identified based on a failing test execution executing code appearing at the defect location. In the present disclosure, candidate patches that satisfy the tests of the one or more test suites 111 may be referred to as "plausible patches."

In some embodiments, the repair module 106 may be configured to generate candidate patches as described herein.

In some embodiments, the repair module 106 may be configured to access code sources 118, which may include a code database 114 and the project code 116. The code database 114 may include common code patterns that may be derived from big code. For example, the common code patterns may be derived from existing code of existing software programs that may be stored in one or more repositories of existing software programs, such as GitHub or the like.

Modifications, additions, or omissions may be made to FIG. 1 without departing from the scope of the present disclosure. For example, the automated software repair system 100 may include more or fewer elements than those illustrated and described in the present disclosure. In addition, in some embodiments, one or more routines, one or more instructions, or at least a portion of code of the repair module 106, the test suites 111, and the repair template 112 may be combined such that they may be considered the same element or may have common sections that may be considered part of two or more of the repair module 106, the test suites 111, and the repair template 112.

Figure 2:
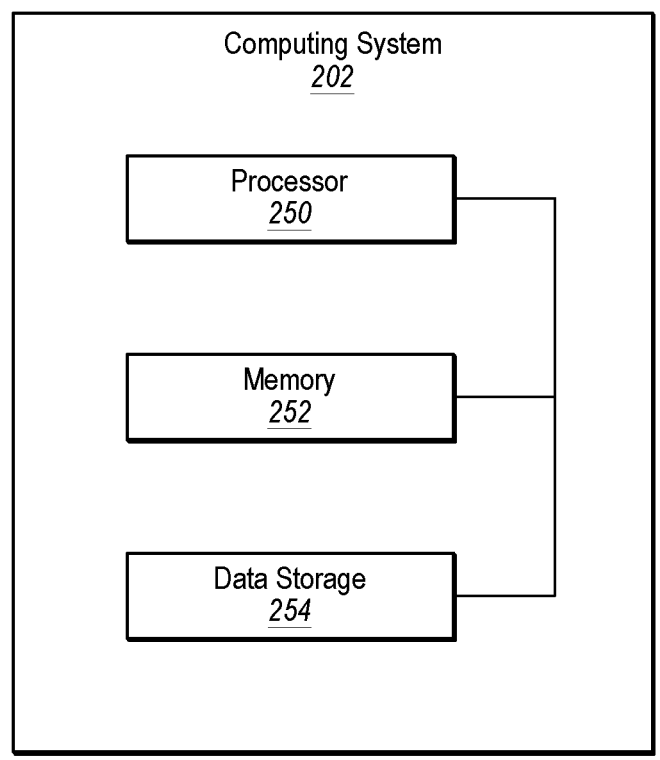
FIG. 2 illustrates an example computing system that may be configured to repair a software program.

FIG. 2 illustrates a block diagram of an example computing system 202, according to at least one embodiment of the present disclosure. The computing system 202 may be configured to implement or direct one or more operations associated with a repair module (e.g., the repair module 106). The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the repair module may be included in the data storage 254 as program instructions. The processor 250 may fetch the program instructions of the repair module from the data storage 254 and may load the program instructions of the repair module in the memory 252. After the program instructions of the repair module are loaded into memory 252, the processor 250 may execute the program instructions such that the computing system may implement the operations associated with the repair module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
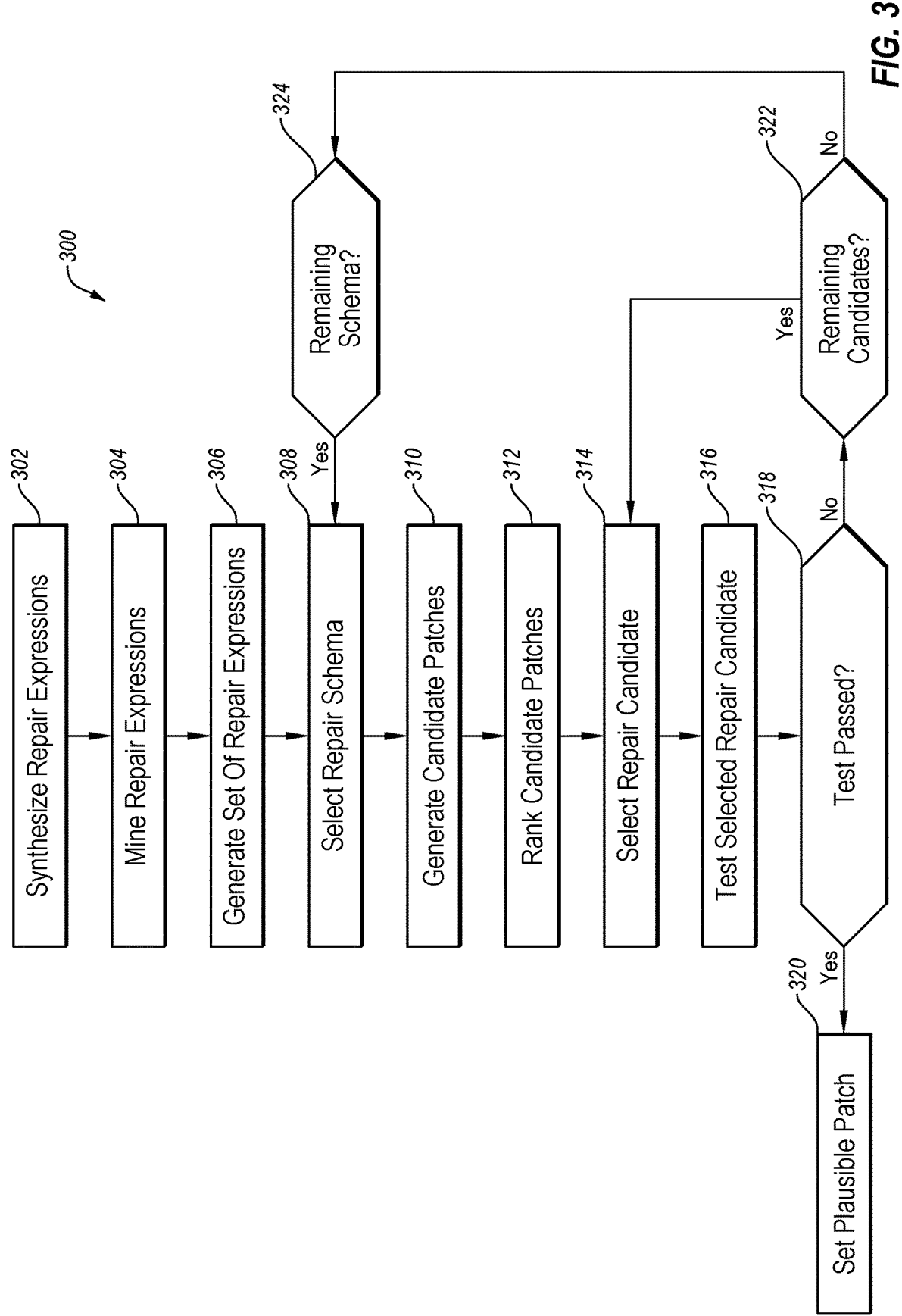
FIG. 3 is a flowchart of an example method of generating, ranking, and testing candidate software repair patches.

FIG. 3 illustrates a method 300 of generating and testing candidate patches. The method 300 may be performed by the repair module 106 of FIG. 1 and by the computing system 202 of FIG. 2. The candidate patches may be generated and tested in an attempt to repair a particular potentially defective ("buggy") portion of code, which may correspond to the code under test 104 of FIG. 1. In some instances, multiple portions of the code may be identified as potentially defective, which may be described as bug localization. Optionally, bug reports may be analyzed in an attempt to identify potentially defective portions of the code. Alternately or additionally, analysis of test cases and other code diagnostics may be employed to identify potentially defective portions of the code. A particular potentially defective portion of the code may be selected ("the selected code portion"), for which candidate patches may be generated and tested. For instance, the multiple potentially defective portions of the code may be ranked by a likelihood that the portion is defective, and a portion of the code identified as being most likely to be defective may be selected.

The method 300 may begin at block 302 by synthesizing repair expressions. Repair expressions may be considered code-based ingredients that may be defined through the code grammar to produce more complex portions of code. In some embodiments, the synthesis of the repair expressions may be based, at least in part, on an analysis of grammar and scope of the code associated with the potentially defective portion of the code. For instance, the repair expressions may be based on Java programming language grammar. Alternately or additionally, the repair expressions may be based on variables, fields, array accesses, method invocations, or the like or any combination thereof, within a scope of the potentially defective portion of the code.

By way of example and not of limitation, the following table provides a list of repair expressions that may be synthesized for a hypothetical potentially defective portion of code.

| Variables | Method Invocations |
|---|---|
| i | pattern.toLowerCase(locale) |
| iValue | pattern.indexOf(thisYear) |

-continued

| Variables | Method Invocations |
|---|---|
| parser | pattern.toUpperCase(locale) |
| Field | pattern.charAt(thisYear) |
| Regex | regex.insert(java.util.Calendar.FIELD_COUNT, true) |
| locale | regex.insert(java.util.Calendar.FIELD_COUNT, false) |

The method 300 may continue at block 304 by mining repair expressions. The repair expressions may be mined from the project code, such as the project code 116 of FIG. 1, as well as a code database, such as the code database 114 of FIG. 1, or the like. In some embodiments, the expressions may be mined from code having similar or analogous bug reports, test cases, or the like. Alternately or additionally, the expressions may be mined from code having dissimilar bug reports, test cases, or the like. For example, repair expressions may be mined from both code similar to the selected code portion and from code dissimilar to the selected code portion. In some embodiments, a longest common sequence (LCS) algorithm may be employed to generate similarity scores quantifying a similarity between the selected code portion and code portions from the project code or the code database. Tokenization may be performed on the selected code portion and the code portions from the project code or the code database to generate tokens for utilization by the LCS algorithm. The LCS algorithm may result in a similarity score between the selected code portion and a given code portion from the project code or the code database. In some configurations, the similarity score may be between 0, which may represent no similarity between the code portions, and 1, representing complete similarity between the code portions. By way of example, code portions having a similarity score above a particular threshold, such as 0.8 for example, may be considered similar. Code portions have a similarity score below the particular threshold may be considered dissimilar.

In some embodiments, the mined repair expressions may be relatively fine-grained. That is, the mined repair expressions may be relatively concise, in contrast to complete patches, which some mining-based repair generation tools may employ. In some embodiments, repair expressions may be mined from code similar to the selected code portion and from code dissimilar to the selected code portion.

By way of example, and not of limitation, the following table provides a list of repair expressions that may be mined for a hypothetical potentially defective portion of code.

| Mined Expressions |
|---|
| sdf.setTimeZone(NEW_YORK) |
| sdf.parse(date) |
| (f==null)==(s==null) |
| currentStrategy.addRegex(this, regex) |

The method 300 may continue to block 306 by generating a set of repair expressions from the synthesized and mined repair expressions. For example, the set of repair expressions may be formed through combining the synthesized repair expressions and the mined repair expressions and removing duplicated repair expressions. Additionally, further repair expressions may be synthesized from the mined and synthesized expressions. The further repair expressions may conform to one or more particular schema types. For example, if a particular schema type employs Boolean expressions, the further repair expressions may include Boolean repair expressions further synthesized from the synthesized and mined repair expressions. By way of example, if the synthesized and mined repair expressions include the repair expressions A, B, and C, further Boolean repair expressions may include A+B+C, A=B+C, A>B+C, and the like.

The method 300 may continue to block 308 by selecting a repair schema. In some embodiments, the repair schema may be selected based, at least in part, on a heuristic. Alternately or additionally, the schema may be selected based, at least in part, on the code located at the potentially defective portion of the code. By way of example, potential repair schema may include If Insertion, Method Invocation Insertion, Method Invocation Change, or the like for a hypothetical potentially defective portion of code.

For example, the following If Insertion repair schema may be selected.

```
+    if(predicate){
+        Statement
+    }
```

In some embodiments, a more particular repair schema may be selected. For example, the following version of an If Insertion repair schema may be selected for a hypothetical potentially defective portion of code.

```
+    if(predicate){
+        throw Exception(expression)
+    }
```

The method 300 may continue to block 310 by generating candidate patches. For example, the repair expressions of the generated set of repair expressions may be employed in the selected repair schema. Code grammar may be observed in generating the candidate patches. For instance, repair expressions that qualify as Boolean expressions may be used at a location of the repair schema associated with Boolean expressions.

By way of example, the following candidate patches may be generated for a hypothetical potentially defective portion of code.

```
+    if(regex == null){
+        throw Exception(null);
+    }
+    if(regex != null){
+        throw Exception(null);
+    }
+    if(locale == null){
+        throw Exception(null);
+    }
+    if(locale != null){
+        throw Exception(null);
+    }
+    if(locale.getDisplayName( ) == null){
+        throw Exception(null);
+    }
+    if(locale.getDisplayName( ) != null){
+        throw Exception(null);
+    }
+    if(patternMatcher.regionEnd( ) == patternMatcher.regionStart( )){
+        throw Exception(null);
+    }
+    if(patternMatcher.regionEnd( ) != patternMatcher.regionStart( )){
+        throw Exception(null);
+    }
```

The method 300 may continue to block 312 by ranking the candidate patches. In some embodiments, some pre-determined number of the top ranked candidate patches may further be identified as prospect for testing. For example, a top two million ranked candidate patches may be identified as prospects for testing, although some other number of ranked candidate patches may be identified as prospects for testing. Alternately, the candidate patches identified as prospects for testing may be based on a threshold ranking score. For instance, candidate patches having a ranking score above the threshold may be considered prospects for testing. In some configurations, candidate patches having a ranking score below the threshold may not be considered prospects for testing. In some further configurations, a combination of identification techniques may be used to identify candidate patches as prospects for testing.

In some embodiments, the candidate patches may be ranked by a score associated with a frequency and co-occurrence analysis in a buggy class. Such a score is herein identified by the reference $f_1$. The $f_1$ score may be based on an analysis of a frequency at which the repair expressions of the candidate patches occur together in the project code. By way of example, hypothetical project code may include expressions A, B, and C, with A and B often appearing together in the project code and A and C failing to appear together in the project code. A candidate patch for the hypothetical project code that includes A and B repair expressions may be given a relatively higher $f_1$ score than a candidate patch that includes A and C repair expressions.

Alternately or additionally, the candidate patches may be ranked by a score associated with a frequency and co-occurrence analysis in a buggy method. Such a score is herein identified by the reference $f_2$. The $f_2$ score may be based on an analysis of a frequency at which relationships between the repair expressions of the candidate patches occur together in a particular buggy method in the project code. By way of example, hypothetical project code may include expressions A, B, and C, as well as multiple methods, of which a particular method may be buggy. If A and B appear together in the particular buggy method and A and C fail to appear together in the particular buggy method, a candidate patch for the hypothetical project code that includes A and B repair expressions may be given a relatively higher $f_2$ score than a candidate patch that includes A and C repair expressions.

Alternately or additionally, the candidate patches may be ranked by a score associated with a frequency of predicate structure. Such a score is herein identified by the reference $f_3$. The $f_3$ score may be based on an analysis of a frequency at which the predicate structure of the candidate patches occurs in a code database, such as the code database 114 of FIG. 1. By way of example, the code database may include multiple occurrences of "A==B," with "A>B" and "A<B" failing to appear or rarely appearing. A candidate patch for the hypothetical project code that includes "A==B" may be given a relatively higher $f_3$ score than a candidate patch that includes "A<B" or "A>B."

Alternately or additionally, the candidate patches may be ranked by a score associated with a frequency of pairwise idioms. The $f_4$ score may be based on an analysis of a frequency at which the pairwise idioms of the candidate patches occurs in a code database, such as the code database 114 of FIG. 1. By way of example, the code database may include multiple occurrences of expressions including the text "end" paired with counterpart expressions including the text "start," which may outnumber other text pairings. Other examples of terms that may often appear together may include "high" and "low," "minimum" and "maximum," "height" and "width," and the like. A candidate patch for the hypothetical project code that includes, for example, "start" and "end" may be given a relatively higher $f_4$ score than a candidate patch that includes some other pair of terms that may not often appear together.

In some embodiments, a total score for a particular candidate patch may include a weighted sum of the $f_1$, $f_2$, $f_3$, and $f_4$ scores. For example, the total score may equal $S_\theta(f_1,f_2,f_3,f_4)$, where $\theta=[w1,w2,w3,w4]$, which may be a weight vector and $[f_1,f_2,f_3,f_4]$ may be a feature vector for the particular candidate patch. In some instances, ranking score of a particular candidate patch may be equal to an unweighted sum of the $f_1$, $f_2$, $f_3$, and $f_4$ scores (e.g., where the weighting for each score is equal).

The method 300 may continue to block 314 by selecting a candidate patch. The selected candidate patch may be a highest ranked untested candidate patch.

The method 300 may continue to block 316 by testing the selected candidate patch. The selected candidate patch may be tested using a test suite, such as the test suite 111 of FIG. 1.

The method 300 may continue to block 318 by determining whether the selected candidate patch passed the relevant tests. If it is determined that the selected candidate patch did pass the relevant tests, the method may continue to block 320 by classifying the selected candidate patch as a plausible patch.

If it is determined that the selected candidate patch did not pass the relevant tests, the method 300 may continue to block 322 by determining whether any of the candidate patches remain available for testing. If it is determined that an untested candidate patch is available for testing, the method 300 may return to block 314 by selecting the highest ranked untested candidate patch.

If it is determined that no more untested candidate patches are available for testing, the method 300 may continue to block 324 by determining whether any of the repair schemas remain available for generating candidate patches from the set of repair expressions. If it is determined that a repair schema remains available for generating candidate patches, the method may return to block 308 by selecting a next repair schema. In some embodiments, if it is determined that no repair schema remains available for generating candidate patches, a different potentially defective portion of the code may be selected and the method 300 may be repeated for the different potentially defective portion of the code.

Modifications, additions, or omissions may be made to the method 500 without departing from the scope of the present disclosure. For example, the operations of method 500 may be implemented in differing order. For instance, the operations related to normalizing the code may be performed in a different order than described or illustrated or may be performed concurrently.

Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. For instance, in some embodiments, the operations related to calculating the hash function may be omitted. Additionally, in some embodiments, the method 500 may be performed iteratively in which a single window of existing code may be analyzed at a time. Additionally or alternatively, one or more operations associated with one or more blocks may be performed with respect to multiple windows of existing code at a time.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 or data storage 254 of FIG. 2) for carrying or having computer-executable instructions or data structures stored thereon.

As used in the present disclosure, the term "module" may refer to specific hardware implementations configured to perform the actions of the module and/or software objects or software routines that may be stored on and/or executed by general purpose hardware (e.g., computer-readable media, processing devices, etc.) of the computing system. In some embodiments, the modules and methods described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the scope of the present disclosure.

What is claimed is:

1. A method of automated candidate repair patch generation, the method comprising:
    synthesizing repair expressions based on project code;
    mining concise repair expressions from a code database;
    generating a set of repair expressions based on the synthesized repair expressions and the mined repair expressions, including further synthesizing further repair expressions based on the synthesized repair expressions and the mined repair expressions; and
    generating candidate patches based on a repair schema and the set of repair expressions,
    wherein the mining of the concise repair expressions from the code database includes mining repair expressions from both portions of code determined to be similar to a code portion for which the candidate patches are being generated as having a similarity score above a particular threshold as determined by an algorithm and portions of code determined to be dissimilar to the code portion for which the candidate patches are being generated as having a similarity score below the particular threshold as determined by the algorithm.

2. The method of claim 1, further comprising ranking the candidate patches.

3. The method of claim 2, wherein the ranking of a candidate patch of the plurality of candidate patches is based on:
    a frequency at which the repair expressions of the candidate patch occur together in the project code;
    a frequency at which the repair expressions of the candidate patch occur together in a buggy method in the project code;
    a frequency at which a predicate structure of the candidate patch occurs in the code database; and
    a frequency at which a pairwise idiom of the candidate patches occurs in the code database.

4. The method of claim 3, wherein:
    the frequency at which the individual repair expressions of the set of repair expressions of the candidate patch occur together in the project code is associated with a first score;
    the frequency at which the individual repair expressions of the set of repair expressions of the candidate patch occur together in the buggy method in the project code is associated with a second score;
    the frequency at which a predicate structure of the candidate patch occurs in the code database is associated with a third score;
    the frequency at which a pairwise idiom of the candidate patch occurs in the code database is associated with a fourth score; and
    the ranking of the candidate patch of the plurality of candidate patches is based on a sum of the first score scaled by a first weight value, the second score scaled by a second weight value, the third score scaled by a third weight value, and the fourth score scaled by a fourth weight value.

5. The method of claim 2, wherein the ranking of the candidate patch of the plurality of candidate patches is based on a frequency at which the repair expressions of the candidate patches occur together in the project code.

6. The method of claim 2, wherein the ranking of the candidate patch of the plurality of candidate patches is based on a frequency at which the repair expressions of the candidate patches occur together in a buggy method in the project code.

7. The method of claim 2, wherein the ranking of the candidate patch of the plurality of candidate patches is based on a frequency at which a predicate structure of the candidate patches occurs in the code database.

8. The method of claim 2, wherein the ranking of the candidate patch of the plurality of candidate patches is based on a frequency at which a pairwise idiom of the candidate patches occurs in the code database.

9. The method of claim 2, further comprising testing the candidate patches in an order of the ranking of the candidate patches.

10. Non-transitory computer-readable storage media configured to store instructions that, in response to being executed, cause a system to perform operations of automated candidate repair patch generation, the operations comprising:
    synthesizing repair expressions based on project code;
    mining concise repair expressions from a code database;
    generating a set of repair expressions based on the synthesized repair expressions and the mined repair expressions, including further synthesizing further repair expressions based on the synthesized repair expressions and the mined repair expressions; and
    generating candidate patches based on a repair schema and the set of repair expressions,
    wherein the mining of the concise repair expressions from the code database includes mining repair expressions from both portions of code determined to be similar to a code portion for which the candidate patches are being generated as having a similarity score above a particular threshold as determined by an algorithm and portions of code determined to be dissimilar to the code portion for which the candidate patches are being generated as having a similarity score below the particular threshold as determined by the algorithm.

11. The computer-readable storage media of claim 10, the operations further comprising ranking the candidate patches.

12. The computer-readable storage media of claim 11, wherein the ranking of a candidate patch of the plurality of candidate patches is based on:
    a frequency at which the repair expressions of the candidate patch occur together in the project code;
    a frequency at which the repair expressions of the candidate patch occur together in a buggy method in the project code;
    a frequency at which a predicate structure of the candidate patch occurs in the code database; and
    a frequency at which a pairwise idiom of the candidate patches occurs in the code database.

13. The computer-readable storage media of claim 12, wherein:
- the frequency at which the individual repair expressions of the set of repair expressions of the candidate patch occur together in the project code is associated with a first score;
- the frequency at which the individual repair expressions of the set of repair expressions of the candidate patch occur together in the buggy method in the project code is associated with a second score;
- the frequency at which a predicate structure of the candidate patch occurs in the code database is associated with a third score;
- the frequency at which a pairwise idiom of the candidate patch occurs in the code database is associated with a fourth score; and
- the ranking of the candidate patch of the plurality of candidate patches is based on a sum of the first score scaled by a first weight value, the second score scaled by a second weight value, the third score scaled by a third weight value, and the fourth score scaled by a fourth weight value.

14. The computer-readable storage media of claim 11, wherein the ranking of the candidate patch of the plurality of candidate patches is based on a frequency at which the repair expressions of the candidate patches occur together in the project code.

15. The computer-readable storage media of claim 11, wherein the ranking of the candidate patch of the plurality of candidate patches is based on a frequency at which the repair expressions of the candidate patches occur together in a buggy method in the project code.

16. The computer-readable storage media of claim 11, wherein the ranking of the candidate patch of the plurality of candidate patches is based on a frequency at which a predicate structure of the candidate patches occurs in the code database.

17. The computer-readable storage media of claim 11, wherein the ranking of the candidate patch of the plurality of candidate patches is based on a frequency at which a pairwise idiom of the candidate patches occurs in the code database.

18. The computer-readable storage media of claim 11, the operations further comprising testing the candidate patches in an order of the ranking of the candidate patches.

* * * * *